W. H. McMURTRY.
FILTER.
APPLICATION FILED APR. 2, 1912.
1,047,101.
Patented Dec. 10, 1912.
2 SHEETS—SHEET 1.
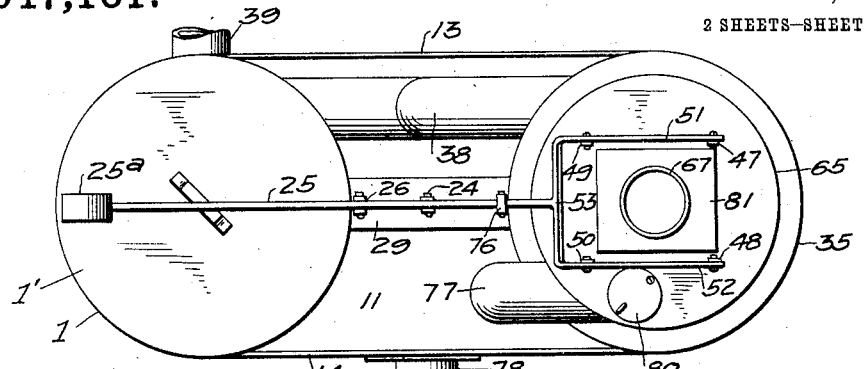
Fig. 1.
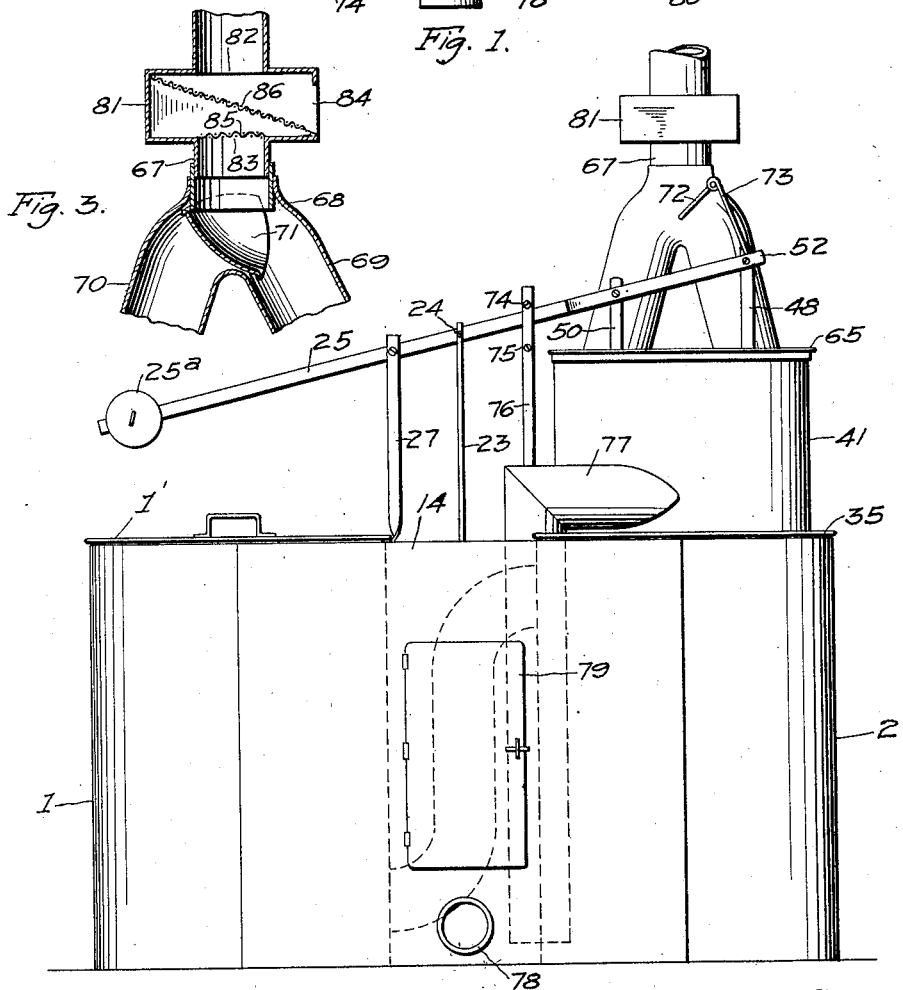
Fig. 3.
Fig. 2.
Witnesses
R. M. Brennan
James H. Shelly
Inventor
W. H. McMurtry.
By John N. Holt
his Attorney
COLUMBIA PLANOGRAPH CO., WASHINGTON, D. C.

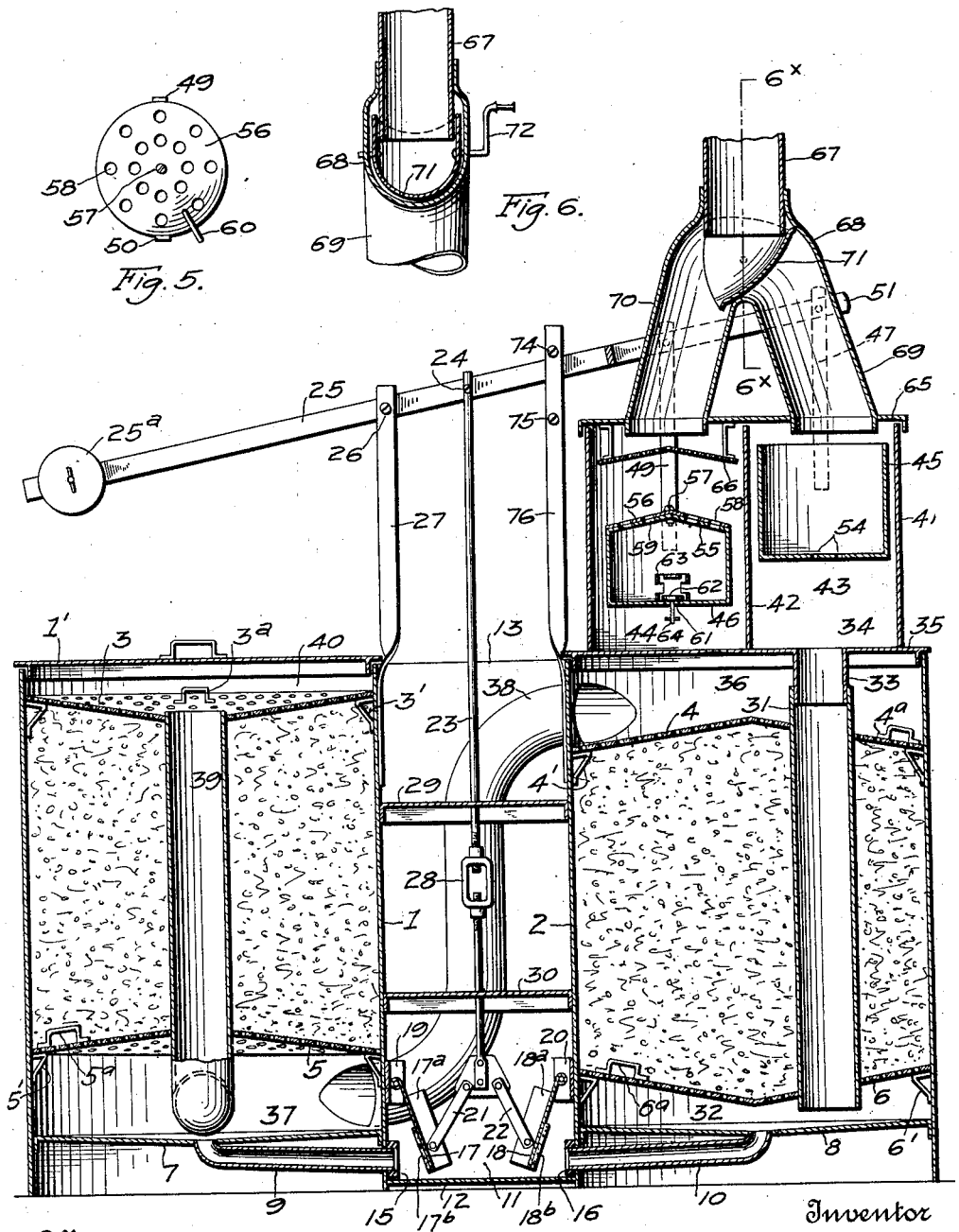

UNITED STATES PATENT OFFICE.

WILLIE H. McMURTRY, OF ELIZABETHTOWN, KENTUCKY.

FILTER.

1,047,101.  Specification of Letters Patent.  Patented Dec. 10, 1912.

Application filed April 2, 1912. Serial No. 688,119.

*To all whom it may concern:*

Be it known that I, WILLIE H. MCMURTRY, a citizen of the United States, residing at Elizabethtown, in the county of Hardin and State of Kentucky, have invented certain new and useful Improvements in Filters, of which the following is a specification.

This invention relates more especially to improvements in that class of filters which are designed to filter rain water after it has fallen on the roof of a building and passed from the gutters into the downspout. In filters of this class, generally all of the water from the downspout passes into the filter from the time rain commences to fall until it ceases. A serious objection to such filters is the fact that the water from the downspout passes into the filter for the entire duration of the rain. The result of this is that the filter receives a considerable amount of water which is not clean, due to the presence of dirt, soot, bird droppings and other foreign matter, which is usually present to more or less extent upon house roofs.

The primary object of this invention is to provide a filter which will obviate the above mentioned defects by allowing the rain water to pass from the downspout and go to waste for a sufficient length of time to insure the water passing into the filter being clean, and then automatically start the filter into operation with clean water.

My said invention also embodies certain other features which will appear from the following description and claims.

In order to more fully describe my said invention, reference will be had to the accompanying drawings, in which similar numerals refer to similar parts, wherein;

Figure 1 represents in top plan, a filter embodying one specific form of my invention; Fig. 2, a side elevation of said filter; Fig. 3, a detail vertical sectional elevation of the dirt screen and mechanism for starting the filter into operation; Fig. 4, a central vertical sectional elevation of the form of my invention shown in Fig. 2; Fig. 5, a top plan view of the bucket which starts the filter into operation, and Fig. 6 is a detail vertical sectional elevation of the cut-off mechanism, taken on the line $6^x$—$6^x$, Fig. 4.

Referring to the accompanying drawings, 1 and 2, represent two filter tanks, which may be of any desired shape, provided respectively with perforated false tops and bottoms 3, 4, and 5, 6, respectively, between which is carried charcoal or any other suitable filtering material as shown. These tops and bottoms are removably supported respectively upon brackets $3''$, $4'$, $5'$ and $6'$, made fast to the tanks, this arrangement permitting of the ready removal of the said false tops and bottoms for cleaning the filter. The false tops and bottoms may be provided with suitable handles $3^a$, $4^a$, $5^a$ and $6^a$ for removing them. These tanks are also provided respectively with permanent bottoms 7 and 8, preferably inclined toward the center, at which points outlet or drain pipes 9 and 10 are inserted. These drain pipes lead into a waste chamber 11, formed by the walls 1 and 2 of the tanks, a plate or bottom 12, and side plates 13 and 14 secured to the sides of the tanks and the bottom plate 12. The drain pipes 9 and 10 at their outlet ends, are provided with rubber sleeves 15 and 16 respectively, adapted to form seats for two clap valves 17 and 18, pivotally supported by the brackets 19 and 20, and operated by the action of the toggle links 21, 22, connected to webs or flanges $17^a$ and $18^a$ on the valves and to an actuating rod 23, which latter is pivotally connected at 24 to a counterbalance arm 25, said arm being fulcrumed as at 26 on a support 27, made fast to the side of the tank. The seating faces of these valves are provided with leather or other resilient pieces $17^b$ and $18^b$. For adjustment, the rod 23 is made in two sections connected by a turn buckle 28, and passes through two guide stays 29 and 30. This counterbalance lever and its operating mechanism will be more particularly described later.

Tank 1 is provided with an inlet pipe 31, opening at its lower end into the space 32 in the lower portion of the tank and connecting at its upper end with a thimble 33 extending downward from an opening 34 in a removably flanged cover 35, which fits the top of the tank. Space 36 at the upper end of tank 2 is in communication with space 37 at the bottom of tank 1, through a duct 38 which conveys water from tank 2 to tank 1. The filtered water passes from tank 1, through an outlet pipe 39 opening into the space 40 at the top of tank 1 and extending downward through the center of the tank thence out through space 37 below the false bottom 5, to the place of storage.

Made fast to the removable cover 35 of tank 2, is a smaller tank 41, divided preferably at or near its center, by a partition 42, into two separate chambers 43 and 44, the latter being connected by the thimble 33 to the inlet pipe 31. Within these two chambers are located respectively two buckets 45 and 46, pivotally suspended by means of arms 47—48 and 49—50, from the two arms 51 and 52 of a yoke 53 of the counterbalance lever 25. The arms 47—48 and 49—50 are rigidly secured to the sides of their respective buckets. The bucket 45 comprises merely an open top vessel having a series of small holes 54 in its bottom of such size as to permit of slow escape of water from said bucket. The bucket 46 is provided with a perforated permanent upwardly slanting or conical top 55, and a similarly shaped shutter 56, pivoted as at 57 to said top and having a series of openings 58 corresponding to the openings 59 of the top 55. By means of a thumb piece 60, made fast to the shutter 56, the said shutter may be rotated so as to vary the effective size of the openings through the top of the bucket. In the bottom of bucket 46 is an opening 61 which is controlled by a plunger valve 62, retained within a suitable cage 63 and provided with a stem 64 which extends through opening 61 for the purpose of operating said valve as hereinafter described.

The casing or tank 41 is provided with a removable cover 65, and secured to the lower side of this cover directly above bucket 46 is a perforated deflector or baffle plate 66 which performs a two-fold function; first, it prevents any suspended bodies, such as sticks, straw, leaves, &c., from entering the bucket 46 and preventing the proper action of its valve; second, it breaks the force of the falling water, so that in a hard rain, the bucket will not be driven downward until it is entirely full.

67 represents the main delivery duct or pipe which leads from a gutter downspout or otherwise receives the rain water from a roof. This duct 67 leads into the upper end of a valve casing 68 which has two outlets or branches 69 and 70, the former constituting the outlet for supplying water to the filter to be filtered; while the latter constitutes a by-pass to deliver water to the bucket 46 for starting the filter into operation.

Pivotally mounted within the valve casing 68 is a swinging valve 71, so shaped that in either of its operating positions, the upper edge will pass well up behind the lower edge of the intake pipe 67 or extension thereof, thereby putting one of the outlet branches 69, 70 into communication with the inlet 67 and effectually closing the opening into the other branch. One of the pivotal connections of the swinging valve 71 is bent to form a lever arm 72 (see Fig. 6) which is connected by the link 73 to the arm 52 of the counterbalance lever 25. This lever 25, which is provided with an adjustable counterbalance weight 25$^a$ is limited in its angular movement by the stops 74 and 75 on the upright 76, which is provided with a vertical slot or guide way in which the lever 25 may move.

Opening into the chamber 43 is a pipe 77 which discharges into the waste chamber 11, where escape of the waste water is permitted by the outlet 78. Waste water from the filter outlets 9 and 10 also escapes into this chamber 11, and passes off by the same outlet 78. Access to the waste chamber 11 may be had through an opening in its side provided with a door 79. Access may be had into the chamber 44 for adjusting the shutter 56 or for other purposes, through a hand hole in the cover 65, provided with a suitable cover 80.

In order to guard against the entrance of such solid matter into the valve casing 68 as might interfere with the operation of the filter, I may provide means for shunting this from the pipe 67 before it reaches said valve casing. A form of such a device is shown in Figs. 2 and 3 and comprises a box or casing 81 having an opening 82 in its top and a similar opening 83 in its bottom and open as at 84 at one side. A section of the inlet pipe 67 leads into the opening 82 and another section thereof leads from the opening 83 into the casing 67, the latter opening being covered by wire or other suitable screening 85. Located within the casing 81 between the two openings 82 and 83 and slanting downward to the lower edge of the side opening 84 is a screen 86 preferably engaging the sides of the casing. Obviously any foreign matter entering from the upper section of the inlet pipe 67 will fall upon the screen 86 and be discharged out of the side opening 84. The screen 85 merely constitutes an additional precaution against the passage of foreign matter through the opening 83, and for this purpose may be of finer mesh than the slanting screen 86.

Access to the interior of the tank 1 may be had by removing the movable flanged cover 1' with which the tank is provided.

The operation of the filter is as follows: In Figs. 2 and 4 the moving parts are shown in the position they occupy normally; that is, when the filter is not working, the counterbalance weight 25$^a$ being down and the opposite end of the arm 25 being in its uppermost position, with the buckets 45 and 46 up, the cut-off 71 closing the branch 69, and the clap valves 17 and 18 open. Now let us assume that rain commences to fall, and that water is passing from the downspout through the inlet pipe 67 (see Fig. 4). This water first encounters the cut-off 71 and is deflected into the by-pass outlet or branch 70, from which it passes to the baffle plate 66. A part of this water runs off the sides of said plate and the remainder passes through its openings and falls upon the top of the bucket 46, and here again, part of the water runs off the bucket, while a portion of it enters by the openings 58, 59. This waste water, which contains roof washings, leaves the chamber 43 by the pipe 77, passes into the waste chamber 11, and escapes through the outlet 78. The size of the openings in the top of bucket 46 have been previously adjusted, so that by the time the bucket is full, the roof of the building has been thoroughly washed and the rain water then passing into the downspout is relatively clean. When the bucket 46 is full, its weight is sufficient to overcome that of the counterbalance weight 25ª and consequently the bucket descends. This effects several operations by causing that arm of the lever 25 to which the bucket 46 is attached to descend. The rod 23 is thereby sent downward and operates to close the clapper valves 17 and 18 against the seats 15 and 16, whereby the outlet pipes 9 and 10 are closed. This movement of lever 25 also operates through the link 73 the cut-off 71 and shifts it to the position shown in Fig. 3. The water is then shunted into the main branch 69 from which it passes into bucket 45. The holes 54 in this bucket are so small as to prevent the water from passing out of the bucket faster than it passes in, so that after a short while the bucket becomes full. When bucket 46 descends, as described, the stem of its valve 62 engages the bottom of the chamber 44 and unseats the valve, whereby the bucket becomes emptied; but by that time, there is a sufficient quantity of water in bucket 45 to hold the buckets in the down position. As the water continues to pass into bucket 45 it will overflow, passing into chamber 43, thence through opening 34, and thimble 33 into the pipe 31, thence into space 32 and up through the filtering material of tank 1 to space 36; thence through pipe 38 to the lower space 37 of tank 2, thence up through the filtering material of that tank to space 40 from which it passes into main outlet 39 to the place of storage. When the rain has ceased, bucket 45 slowly empties by the water therein escaping through the small holes 54. When the weight of this bucket has become sufficiently diminished by the escape of water, the buckets will then rise to their normal positions, the lever arm 25 raising the rod 23 and thereby opening the escape valves 17 and 18, thus permitting the water which still remains in the filtering material to drain off through the escape pipes 9 and 10. The parts are now all restored to their normal positions and the filter is now ready to go through another series of operations, as described.

From the foregoing description, it will be seen that my improved arrangement provides very effectually against the filtering of unclean water containing the washings of roofs, which it is common practice to permit to pass into filters, and in effecting this, I provide a mechanism which is purely automatic. When once set up, the device may therefore be left alone to work itself. Moreover, the parts are few and simple in construction, and therefore require a minimum amount of attention. The location and construction of the valves 17 and 18 also add to the general efficiency of the filter. Being on the outside of the filter tanks, and an inspection door being provided, they are easy of access and their cushion seats render them sure of action. Such valves close very effectually against gravel and sand.

It should be understood that my invention is not limited to any specific number of filter tanks; I may employ only one, or any other desired number.

Various other modifications may be made in my invention as herein shown, without departing from the true spirit thereof.

Without limiting my invention to the specific form shown, what I claim is:

1. In a water filter, the combination with a filter tank, of automatic means to control the flow of water to said tank, said means comprising a valve, two branch ducts controlled thereby, a gravity operated movable member, two buckets carried by said member, operative connection between said buckets, said member and said valve, the said buckets being operated by the water passing through said branch ducts respectively to control the operation of said valves.

2. In a water filter, the combination with a filter tank, of automatic means to control the flow of water to said tank, said means comprising a valve, two branch ducts controlled thereby, a weighted lever, two buckets carried by said lever, operative connection between said buckets, said lever and said valve, the said buckets being operated by the water passing through said branch ducts respectively to control the operation of said valves.

3. In a water filter, the combination with a filter tank, of automatic means to control the flow of water to said tank, said means comprising a valve, two branch ducts controlled thereby, a gravity operated movable member, two buckets carried by said member, operative connection between said buckets, said member and said valve, the said buckets being operated by the water passing through said branch ducts respectively to control the operation of said valves, and separate chambers in which said buckets are located.

4. In a water filter, the combination with a filter tank, of automatic means to control the flow of water to said tank, said means comprising a valve, two branch ducts controlled thereby, a gravity operated movable member, two buckets carried by said member, operative connection between said buckets, said member and said valve, the said buckets being operated by the water passing through said branch ducts respectively to control the operation of said valves, said tank being provided with an outlet near its bottom, a valve to control said outlet, and operative connection between said valve and said gravity operated member.

5. In a water filter, the combination with a filter tank having a valve controlled inlet and a valve controlled outlet, of a weighted lever, operative connections between said lever and both said valves, and means comprising two buckets connected to said lever to operate the same.

6. In a water filter, the combination with a filter tank, of a duct for supplying water to said tank, a by-pass leading from said duct, a valve controlling both the passage of water through said by-pass and the passage of water through said duct to said tank, a weighted lever connected to said valve to operate the same, means comprising a bucket connected to said lever and adapted to receive water through said by-pass to operate said valve to close said by-pass, and means comprising a second bucket connected to said lever and adapted to receive water through said duct, on the closure of said by-pass, for delivery to the filter tank, and operative by the weight of said water to retain said valve in position to close said by-pass and divert the water to the filter tank, the said second named bucket being provided with self-emptying means, the said weighted lever acting when the weight of said bucket has thus become diminished to automatically operate said valve to open said by-pass and close the passage of water to said filter tank.

7. In a water filter, the combination with a filter tank, of a duct to convey water to said tank to be filtered, a by-pass leading from said duct to convey water to waste, a valve adapted to control both said by-pass and duct, a weighted lever, a bucket carried by an arm of said lever and adapted to receive water from said by-pass, said bucket having a perforated top and a valve controlled outlet, said valve being adapted to open said outlet on the descent of said bucket, a second bucket having a continuously open restricted outlet and carried by the same arm of said lever as the aforesaid bucket and adapted to receive water from said duct, operative connection between said lever and said valve, whereby the water flowing into the first named bucket operates said valve to close said by-pass and divert the water to said second bucket which retains the valve in said position after the first bucket has become empty, and an outlet for water from said tank.

8. In a water filter, the combination with a filter tank, of a duct to convey water to said tank to be filtered, a by-pass leading from said duct to convey water to waste, a valve located at the junction of said by-pass and duct to control the same, a weighted lever, a bucket carried by an arm of said lever and adapted to receive water from said by-pass, said bucket having a perforated top and a valve controlled outlet, said valve being adapted to open said outlet on the descent of said bucket, a second bucket having a continuously open restricted outlet and carried by the same arm of said lever as the aforesaid bucket and adapted to receive water from said duct, operative connection between said lever and said valve, whereby the water flowing into the first named bucket operates said valve to close said by-pass and divert the water to said second bucket which retains the valve in said position after the first bucket has become empty, an outlet for water from said tank, a casing forming two separate chambers in which said buckets are respectively located, one of said chambers having an outlet into the filter tank proper to convey the water to be filtered, and the other of said chambers having an outlet to waste.

9. In a water filter, the combination with a filter tank, of a duct to convey water to said tank to be filtered, a by-pass leading from said duct to convey water to waste, a valve located at the junction of said by-pass and duct to control the same, a weighted lever, a bucket carried by an arm of said lever and adapted to receive water from said by-pass, said bucket having a perforated top and a valve controlled outlet, said valve being adapted to open said outlet on the descent of said bucket, a second bucket having a continuously open restricted outlet and carried by the same arm of said lever as the aforesaid bucket and adapted to receive water from said duct, operative connection between said lever and said valve, whereby the water flowing into the first named bucket operates said valve to close said by-pass and divert the water to said second bucket which retains the valve in said position after the first bucket has become empty, an outlet for water from said tank, a valve controlling said outlet, and operative connection between said valve and said lever, substantially as described.

10. A water filter comprising two filter tanks, a waste chamber formed between said tanks and provided with an outlet for waste water, flushing outlets for said filters opening into said chamber, a movable bucket for automatically controlling the flow of water to said tanks, a chamber in which said bucket is located, and a duct leading from said bucket chamber to said waste chamber.

In testimony whereof I affix my signature in presence of two witnesses.

WILLIE H. McMURTRY.

Witnesses:
R. O. DAUGHERTY,
V. B. HAWKINS.

Copies of this patent may be obtained for five cents each, by addressing the "Commissioner of Patents, Washington, D. C."